US012176736B2

(12) United States Patent
Mossoba et al.

(10) Patent No.: US 12,176,736 B2
(45) Date of Patent: Dec. 24, 2024

(54) MULTI-PURPOSE DEVICE SECURE MOBILE DEVICE CHARGING LOCATIONS

(71) Applicant: Capital One Services, LLC, McLean, VA (US)

(72) Inventors: Michael Mossoba, Great Falls, VA (US); Dan Lin, Arlington, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 250 days.

(21) Appl. No.: 17/655,318

(22) Filed: Mar. 17, 2022

(65) Prior Publication Data

US 2023/0299595 A1 Sep. 21, 2023

(51) Int. Cl.
*H02J 7/00* (2006.01)
*H02J 50/80* (2016.01)
*G06F 21/84* (2013.01)

(52) U.S. Cl.
CPC ...... *H02J 7/00045* (2020.01); *H02J 7/00036* (2020.01); *H02J 50/80* (2016.02); *G06F 21/84* (2013.01)

(58) Field of Classification Search
CPC ..... H02J 7/00045; H02J 7/00036; H02J 50/80
USPC ........................................................ 726/21
See application file for complete search history.

(56) References Cited

U.S. PATENT DOCUMENTS

| 10,225,440 | B2 | 3/2019 | Truong | |
|---|---|---|---|---|
| 2012/0262112 | A1* | 10/2012 | Ross | B60L 53/16 |
| | | | | 320/109 |
| 2014/0361728 | A1* | 12/2014 | Qian | H02J 50/80 |
| | | | | 320/106 |
| 2018/0012438 | A1* | 1/2018 | Sinofsky | G07F 5/26 |
| 2019/0214835 | A1* | 7/2019 | Jabori | H02J 7/0044 |
| 2019/0220719 | A1* | 7/2019 | Locke | H01M 10/46 |
| 2023/0316284 | A1* | 10/2023 | Kramme | G06Q 20/405 |
| | | | | 705/44 |

OTHER PUBLICATIONS

U.S. Appl. No. 15/465,827, filed Mar. 22, 2017, Kramme; Timothy.*
KwikBoost, "Mobile Charging Stations for Every Environment," 2022, https://kwikboost.com/products/.

* cited by examiner

*Primary Examiner* — Tan Doan
(74) *Attorney, Agent, or Firm* — Harrity & Harrity, LLP

(57) ABSTRACT

In some implementations, a multi-purpose device may include a secure charging location for charging mobile devices. The multi-purpose device may receive authentication information associated with a user. The multi-purpose device may communicate with a fraud detection device, to authenticate the user and to identify that the user is associated with an account. The multi-purpose device may detect that a mobile device associated with the user has been placed in the secure charging location. The multi-purpose device may transmit to the fraud detection device and based on authenticating the user, an indication that the mobile device associated with the user has been placed in the secure charging location.

20 Claims, 8 Drawing Sheets

MULTI-PURPOSE DEVICE SECURE MOBILE DEVICE CHARGING LOCATIONS

BACKGROUND

A location-based service (LBS) relates to software services which use geographic data and information to provide services or information to users. For example, a location-based service may use a geographic location of a user device to provide services or information to a user associated with the user device. Location-based services can be used in a variety of contexts, such as health, indoor object search, entertainment, work, and/or personal life, among other examples. Commonly used examples of location based services include navigation software, social networking services, location-based advertising, fraud detection, and/or tracking systems, among other examples.

SUMMARY

Some implementations described herein relate to a multi-purpose device for secure mobile device charging. The multi-purpose device may include a secure charging location for charging mobile devices one or more memories; and one or more processors coupled to the one or more memories. The one or more processors may be configured to receive authentication information associated with a user. The one or more processors may be configured to communicate, with a fraud detection device, to authenticate the user and to identify that the user is associated with an account. The one or more processors may be configured to detect that a mobile device associated with the user has been placed in the secure charging location. The one or more processors may be configured to transmit, to the fraud detection device and based on authenticating the user, an indication that the mobile device associated with the user has been placed in the secure charging location.

Some implementations described herein relate to a method of fraud determination based on a mobile device of a user being stored in a secure mobile device charging location. The method may include receiving, by a server device and from a device that includes the secure mobile device charging location, an authentication request for the user, wherein the authentication request indicates authentication information associated with the user. The method may include determining, by the server device and based on the authentication information, an account associated with the user. The method may include receiving, by the server device and from the device, an indication that the mobile device is stored in the secure mobile device charging location. The method may include modifying, by the server device, one or more fraud detection parameters for exchanges, associated with the account, that occur within a threshold distance from a location of the device based on receiving the indication that the mobile device is stored in the secure mobile device charging location. The method may include determining, by the server device, whether to approve or deny an exchange based on determining whether the exchange is fraudulent using the modified one or more fraud detection parameters and based on an exchange location associated with the exchange.

Some implementations described herein relate to a non-transitory computer-readable medium that stores a set of instructions for a server device. The set of instructions, when executed by one or more processors of the server device, may cause the server device to receive, from an automated teller machine (ATM) that includes a secure mobile device location, an authentication request for a user, wherein the authentication request indicates authentication information associated with the user. The set of instructions, when executed by one or more processors of the server device, may cause the server device to determine, based on the authentication information, an account associated with the user. The set of instructions, when executed by one or more processors of the server device, may cause the server device to receive, from the ATM, an indication that a mobile device is stored in the secure mobile device location. The set of instructions, when executed by one or more processors of the server device, may cause the server device to modify one or more fraud detection parameters for exchanges, associated with the account, that occur within a threshold distance from a location of the ATM based on receiving the indication that the mobile device is stored in the secure mobile device location. The set of instructions, when executed by one or more processors of the server device, may cause the server device to determine whether to approve or deny an exchange based on determining whether the exchange is fraudulent using the modified one or more fraud detection parameters and based on an exchange location associated with the exchange.

DETAILED DESCRIPTION

Figure 1A:
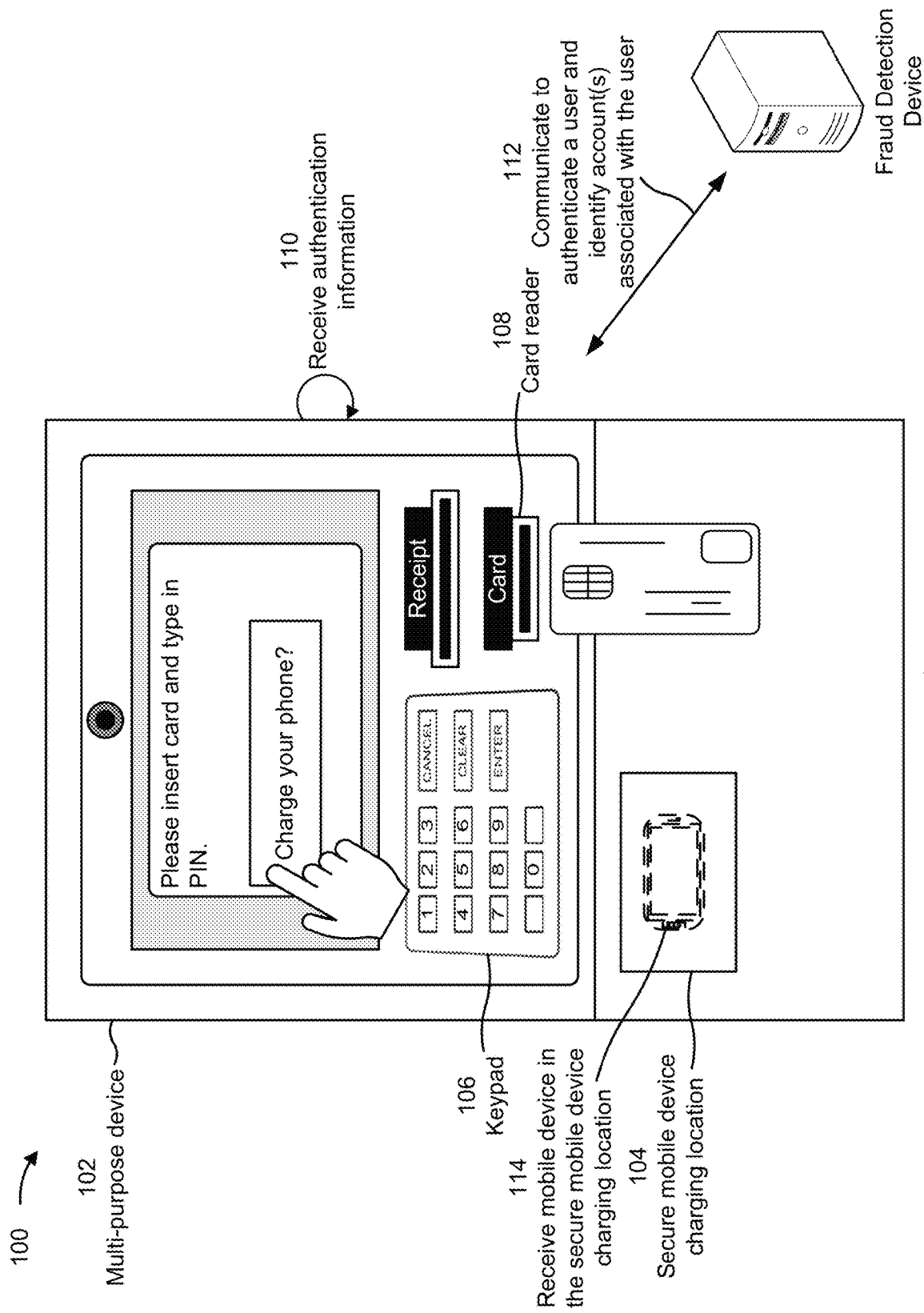
FIGS. 1A-1D are diagrams of an example implementation relating to multi-purpose device secure mobile device charging locations.

The following detailed description of example implementations refers to the accompanying drawings. The same reference numbers in different drawings may identify the same or similar elements.

In some cases, location-based services may be used to improve fraud determinations by a fraud detection platform. For example, a fraud detection device may receive an indication of a geographic location of a mobile device associated with a user. The mobile device and/or the user may be associated with an account with an institution that is associated with the fraud detection device. The fraud detection device may use the geographic location of the mobile device to improve fraud determinations, by the fraud detection device, associated with the account. For example, if the fraud detection device receives an indication of an in-person transaction that is initiated at a geographic location that is different than the geographic location of the mobile device, then the fraud detection device may determine that the transaction is associated with a higher likelihood of fraud (e.g., because it is likely that the user is in the same, or a similar, geographic location as the mobile device). Alternatively, if the fraud detection device receives an indication of an in-person transaction that is initiated at a geographic location that is the same as, or similar to, the geographic location of the mobile device, then the fraud detection device may determine that the transaction is associated with a lower likelihood of fraud.

However, in some cases, a fraud detection device may not have access to a geographic location of the mobile device associated with the user. For example, location-based services are opt-in services that require the user to grant permission to enable the fraud detection device to access information indicating the geographic location of the user. In some cases, the user may not grant permission to enable location-based services, thereby resulting in the fraud detection device not having access to the geographic location of the mobile device for fraud detection determinations. Additionally, or alternatively, the indication of the geographic location of the mobile device may be outdated (e.g., because the information indicating the location of the mobile device may be sent periodically by the mobile device and the mobile device may have moved geographic locations since a last transmission of the information indicating the location of the mobile device), resulting in inaccurate fraud determinations that are based on the geographic location of the mobile device. Additionally, or alternatively, wireless communications indicating the geographic location of the mobile device may be unreliable and/or fail (e.g., if the mobile device does not have access to a wireless network or a signal strength of the mobile device is poor), resulting in the fraud detection device not receiving an indication of the geographic location of the mobile device. Additionally, or alternatively, there may be no way to verify or authenticate that the user associated with the account is actually in possession of the mobile device (e.g., the mobile device may be in the possession of another user).

As a result, the fraud detection device may be unable to use location-based services for improved fraud determinations and/or the fraud determinations made using the geographic location of a mobile device may be inaccurate. This may result in an increase in inaccurate fraud determinations, resulting in an increase in instances of undetected or not prevented fraudulent activities. These fraudulent activities may negatively impact both the user and an institution. The user may be liable for transactions that arose through the fraudulent actor and may attempt to identify and remedy the fraudulent transactions. This may waste computing resources associated with a service, because the computing resources are used to attempt to identify and remedy the fraudulent activity. The institution may also be negatively impacted and waste computing resources associated with attempting to reverse the fraudulent activity for the user, along with attempting to identify, detect, and/or diagnose the fraudulent activity.

Some implementations and techniques described herein are associated with multi-purpose device secure mobile device charging locations. The multi-purpose device may be an automated teller machine (ATM), a storage location (e.g., a storage locker), a point-of-sale terminal, and/or another device having multiple purposes (e.g., the multiple purposes at least including providing a secure mobile device charging location). An ATM may also be referred to as an automated banking machine (ABM), a cash point, a cash machine, and/or similar terms. A fraud detection device may use an indication that a mobile device has been deposited within a secure mobile device charging location of a multi-purpose device to improve fraud determinations made by the fraud detection device associated with an account of a user that is associated with the mobile device.

For example, a user may provide authentication information to the multi-purpose device to authenticate the user. In examples where the multi-purpose device is an ATM, the authentication information may include a personal identification number (PIN) and an indication of an identifier of a transaction card associated with the user and an account (e.g., the user may present or insert the transaction card to the multi-purpose device). The multi-purpose device may transmit, to the fraud detection device, an indication of the authentication information. The fraud detection device may authenticate that the user is associated with the account based on the authentication information. The multi-purpose device may detect that a mobile device (e.g., associated with the user) has been placed in the secure charging location of the multi-purpose device. The multi-purpose device may transmit, to the fraud detection device, an indication that the mobile device associated with the user has been placed in the secure charging location. The indication that the mobile device associated with the user has been placed in the secure charging location may facilitate fraud determinations associated with the account of the user.

For example, based on authenticating the user and receiving the indication that the mobile device associated with the user has been placed in the secure charging location, the fraud detection device may modify one or more fraud detection parameters or models for exchanges, associated with the account, that occur near (e.g., within a threshold distance from) a location of the multi-purpose device. The fraud detection device may determine whether to approve or deny an exchange based on determining whether the exchange is fraudulent using the modified one or more fraud detection parameters and based on an exchange location associated with the exchange (e.g., a location where the exchange is initiated). For example, the fraud detection device may lessen fraud checks (e.g., may decrease one or more values or one or more thresholds associated with the one or more fraud detection parameters) for in-person exchanges, associated with the account, that occur within the threshold distance from the location of the multi-purpose device. For example, if the user is charging the mobile device, it is likely that the user is within a proximity of the multi-purpose device. Therefore, the fraud detection device may modify one or more fraud detection parameters or models to account for a lower likelihood of a fraudulent exchange associated with the account near the multi-purpose device (e.g., because it is likely that the user actually is near the multi-purpose device while the mobile device of the user is charging in the secure mobile device charging location). As another example, the fraud detection device may increase fraud checks (e.g., may increase one or more values or one or more thresholds associated with the one or more fraud detection parameters) for online or card-not-present exchanges associated with the account because a likelihood that the user is conducting online or card-not-present exchanges while the user is away from home and without their mobile device is lower. Therefore, the fraud detection device may modify one or more fraud detection parameters or models to account for a higher likelihood of a fraudulent exchange associated with the account when the exchange is an online or card-not-present exchange and the mobile device is stored in the secure mobile device charging location.

As a result, the fraud detection device may be enabled to use geographic location information associated with the user without relying on or requiring location-based services to be enabled for the mobile device. This may increase a security associated with the mobile device and/or the user because the mobile device is not transmitting information indicating the geographic location of the mobile device (e.g., which could be intercepted by a malicious actor). Additionally, this may conserve battery resources and/or power resources of the mobile device because the mobile device is not required to transmit the information indicating the geographic location of the mobile device and the mobile device is enabled to receive a charge for a battery of the mobile device. Additionally, using a multi-purpose device with a secure mobile device charging location may enable the user to be authenticated (e.g., as associated with the account) by providing authentication information to the multi-purpose device, thereby improving a determination that the user is actually within a geographic proximity to the multi-purpose device. Moreover, using a multi-purpose device with a secure mobile device charging location may conserve space within a physical location of an entity (e.g., in which the multi-purpose device is located) by enabling a single device to perform multiple purposes (e.g., the multiple purposes at least including providing a secure mobile device charging location). Additionally, fraud determinations by the fraud detection device may be improved by modifying fraud detection parameters or models used for fraud determinations associated with the account while the mobile device is stored in the secure mobile device charging location of the multi-purpose device.

FIGS. 1A-1D are diagrams of an example 100 associated with multi-purpose device secure mobile device charging locations. As shown in FIGS. 1A-1D, example 100 includes a multi-purpose device, a fraud detection device, and a mobile device. These devices are described in more detail in connection with FIGS. 2 and 3. The fraud detection device may be associated with an institution (e.g., a financial institution). The institution may provide and/or manage an account (e.g., a credit account, a debit account, and/or another transaction account) associated with a user. The mobile device may be associated with the user.

As shown in FIG. 1A, and by reference number 102, the multi-purpose device may include one or more components. The multi-purpose device may be capable of performing operations associated with multiple purposes. In some other implementations, the multi-purpose device may not be associated with multiple purposes and may only be associated with providing a secure charging location for mobile devices. In some implementations, the multi-purpose device may be a storage location, a storage locker, a charging location (e.g., for mobile devices), and/or another device capable of storing mobile devices. In some implementations, the multi-purpose device may be an ATM. The multi-purpose device may be located in a physical location of an entity (e.g., within a store, a retail location, or another building or location associated with the entity). In some implementations, the entity may be, or may be associated with, the institution.

As shown by reference number 104, the multi-purpose device may include a secure mobile device charging location. The secure mobile device charging location may be a location within a housing of the multi-purpose device, such as compartment, a locker, a cavity, a slot, and/or another area within the housing of the multi-purpose device configured to receive mobile devices. In some implementations, the multi-purpose device may include multiple secure mobile device charging locations. The secure mobile device charging location may be configured to securely store a mobile device. For example, the secure mobile device charging location may include a door or means for closing and/or locking the secure mobile device charging location.

In some implementations, the secure mobile device charging location may include one or more components to facilitate charging mobile devices. For example, the secure mobile device charging location may include an electrical outlet connected to a power source associated with the multi-purpose device. In some implementations, the secure mobile device charging location may include an electric power adapter to convert alternating current (AC) voltage to direct current (DC) voltage that is required to charge a battery of a mobile device. In some implementations, the adapter may be connected to a connector that is configured to mate with a charging port of a mobile device, such as a common external power supply connector, a universal serial bus (USB) connector, a micro-USB connector, a lightning connector, and/or another connector. In some implementations, the secure mobile device charging location may include one or more components associated with a wireless mobile device charger (e.g., a device that uses inductive charging to charge mobile devices).

As shown by reference number 106, the multi-purpose device may include a keypad to enable a user to input information to the multi-purpose device. The keypad is an example of an input component that can be used with the multi-purpose device and other input components are possible (e.g., as described in more detail in connection with FIGS. 2 and 3). In some implementations, the keypad may be included in a display of the multi-purpose device (e.g., a touchscreen keypad). As shown by reference number 108, the multi-purpose device may include a card reader. The card reader may be configured to receive a card (e.g., a transaction card) and obtain information from the card or a component of the card. For example, the card reader may be a magnetic stripe reader, a chip reader (e.g., an integrated circuit (IC) chip reader), a radio frequency (RF) component, a near-field communication (NFC) component, and/or another component capable of obtaining information from a card (e.g., as described in more detail in connection with FIGS. 2 and 3). The multi-purpose device may include one or more other components as described in more detail in connection with FIGS. 2 and 3.

As shown by reference number 110, the multi-purpose device may receive authentication information associated with a user. The authentication information may be associated with an account of the user. For example, the account may be associated with the institution (e.g., that is associated with the fraud detection device). The authentication information may identify the user and/or the account. For example, in cases where the multi-purpose device is an ATM or similar device capable of receiving and/or obtaining information from a card, the multi-purpose device may receive the authentication information (e.g., at least in part) via a card presented to the card reader. For example, the user may place the card within a communicative proximity of the card reader (e.g., the user may tap the card in a location proximate to the card reader or may insert the card into the card reader). The multi-purpose device may receive the authentication information based on the card reader obtaining the authentication information via the card. For example, the authentication information may include an identifier associated with the card and/or a card number, among other examples. The identifier associated with the card may be associated with, or mapped to, an identifier of the account associated with the user. The authentication information may include a secure code, such as a PIN, associated with the account. For example, the multi-purpose device may receive the authentication information via the card (e.g., that is presented to the card reader by the user) and via the keypad (e.g., based on the user inputting the secure code associated with the account into the keypad). In such examples, the authentication information may include the identifier associated with the card and the secure code that is input to the keypad. For example, the multi-purpose device may receive an indication of an account number (e.g., an identifier of the card) associated with the account and a secure code (e.g., a PIN) associated with the account (e.g., via a card presented to the card reader and/or an input to the keypad).

In some other implementations, the authentication information may include additional or different information. For example, in some cases, the authentication information may include biometric information associated with the user. The biometric information may include a fingerprint scan, a facial recognition scan, a retina scan, and/or other biometric information. For example, the multi-purpose device may include one or more biometric scanners (e.g., a fingerprint scanner, a palm scanner, a facial scanner, a retina scanner, and/or another scanner). The multi-purpose device may receive the authentication information via the biometric scanner(s).

In some other implementations, the authentication information may include a code generated by the fraud detection device or another device associated with the institution. For example, the user may request a code to facilitate authentication of the user when the user intends to store the mobile device in the secure mobile device charging location. The user may use the mobile device, or another device, to request the code. The fraud detection device, or the other device associated with the institution, may generate the code. The code may be a unique code that is associated with, or mapped to, the account associated with the user. The code may be a temporary code or a single-use code. The fraud detection device, or the other device associated with the institution, may transmit, to the mobile device or another device associated with the user, an indication of the generated code. The user may obtain the code via the mobile device and may input the code to the multi-purpose device via the keypad. As another example, the code may be scanned by a camera of the multi-purpose device (e.g., the code may be presented for display by the mobile device and scanned by the camera). For example, the code may be a machine-readable code, such as a quick response (QR) code.

As shown by reference number 112, the multi-purpose device may communicate, with the fraud detection device, to authenticate the user and identify one or more accounts associated with the user. For example, the multi-purpose device may communicate, with the fraud detection device, to authenticate the user and to identify that the user is associated with at least one account (e.g., that is associated with the institution). For example, the multi-purpose device may transmit, and the fraud detection device may receive, an authentication request for the user. The authentication request may indicate the authentication information associated with the user. The fraud detection device may authenticate the user based on the authentication information provided by the multi-purpose device. For example, the fraud detection device may compare the authentication information provided by the multi-purpose device to information stored by the fraud detection device. If the authentication information provided by the multi-purpose device matches information stored by the fraud detection device, then the fraud detection device may determine that the user is authenticated. If the authentication information provided by the multi-purpose device does not match any information (e.g., associated with authenticating users and/or accounts) stored by the fraud detection device, then the fraud detection device may determine that the user is not authenticated.

For example, the fraud detection device may determine, based on the authentication information, an account associated with the user. For example, the authentication information provided by the multi-purpose may be mapped to an account (e.g., to an account identifier associated with the account) associated with the user. The fraud detection device may determine the account based on receiving the authentication information. In some implementations, the fraud detection device may determine one or more additional accounts that are also associated with the user. For example, the user may provide authentication information associated with a debit account. The fraud detection device may determine a credit account that is associated with the user, the debit account, and the institution (e.g., the user may have multiple accounts with the institution that are linked to the user).

The fraud detection device may transmit, and the multi-purpose device may receive, an indication of whether the user is authenticated (e.g., in response to the authentication request for the user). If the fraud detection device indicates that the user is authenticated, then the multi-purpose device may enable the user to access one or more functions associated with the multi-purpose device. For example, if the multi-purpose device is an ATM, then the ATM may enable the user to access account information, withdraw or deposit cash, and/or perform one or more other functions provided by the ATM based on receiving the indication that the user is authenticated. In some implementations, the multi-purpose device may enable the user to store the mobile device in the secure mobile device charging location based on receiving the indication that the user is authenticated. As a result, by using the multi-purpose device with a secure mobile device charging location, the fraud detection device may be enabled to authenticate the user (e.g., as associated with the account) by receiving the authentication information, thereby improving a determination that the user is actually within a geographic proximity to the multi-purpose device for fraud determination purposes, as explained in more detail elsewhere herein.

As shown by reference number 114, the multi-purpose device may receive a mobile device in the secure mobile device charging location. In some implementations, the multi-purpose device may receive the mobile device in the secure mobile device charging location while a session associated with the user is in progress. For example, based on receiving the indication that the user is authenticated, the multi-purpose device may initiate a session associated with the user. During the session, the user may deposit the mobile device within the secure mobile device charging location. For example, a function of the multi-purpose device may include providing the secure mobile device charging location. In some implementations, the multi-purpose device may receive a request, from the user, to store the mobile device in the secure mobile device charging location. For example, as shown in FIG. 1A, the display of the multi-purpose device may display a user selection option associated with storing a mobile device in the secure mobile device charging location (e.g., "charge your phone?"). Based on receiving an input to the user selection option (e.g., via an input to the display or the keypad by the user), the multi-purpose device may enable the user to place the mobile device within the secure mobile device charging location (e.g., by causing a door of the secure mobile device charging location to be opened and/or unlocked). The user may deposit the mobile device within the secure mobile device charging location based on the multi-purpose device causing a door of the secure mobile device charging location to be opened and/or unlocked.

In some implementations, the multi-purpose device may display an indication to confirm that the mobile device, that is stored in the secure mobile device charging location, is associated with the user. For example, the user may initiate the session with the multi-purpose device, but a second user associated with the user (e.g., a friend of the user, a child of the user, a spouse of the user, or another user) may store the mobile device (e.g., associated with the second user) in the secure mobile device charging location. Therefore, the multi-purpose device may request that the mobile device is actually associated with the user (e.g., to confirm that the mobile device is owned by the user). This may improve fraud determinations by avoiding scenarios in which a user, other than the user associated with the account, stores or charges a mobile device in the secure mobile device charging location (e.g., and the fraud detection device incorrectly determines that the user's mobile device is stored in the secure mobile device charging location).

Figure 1B:
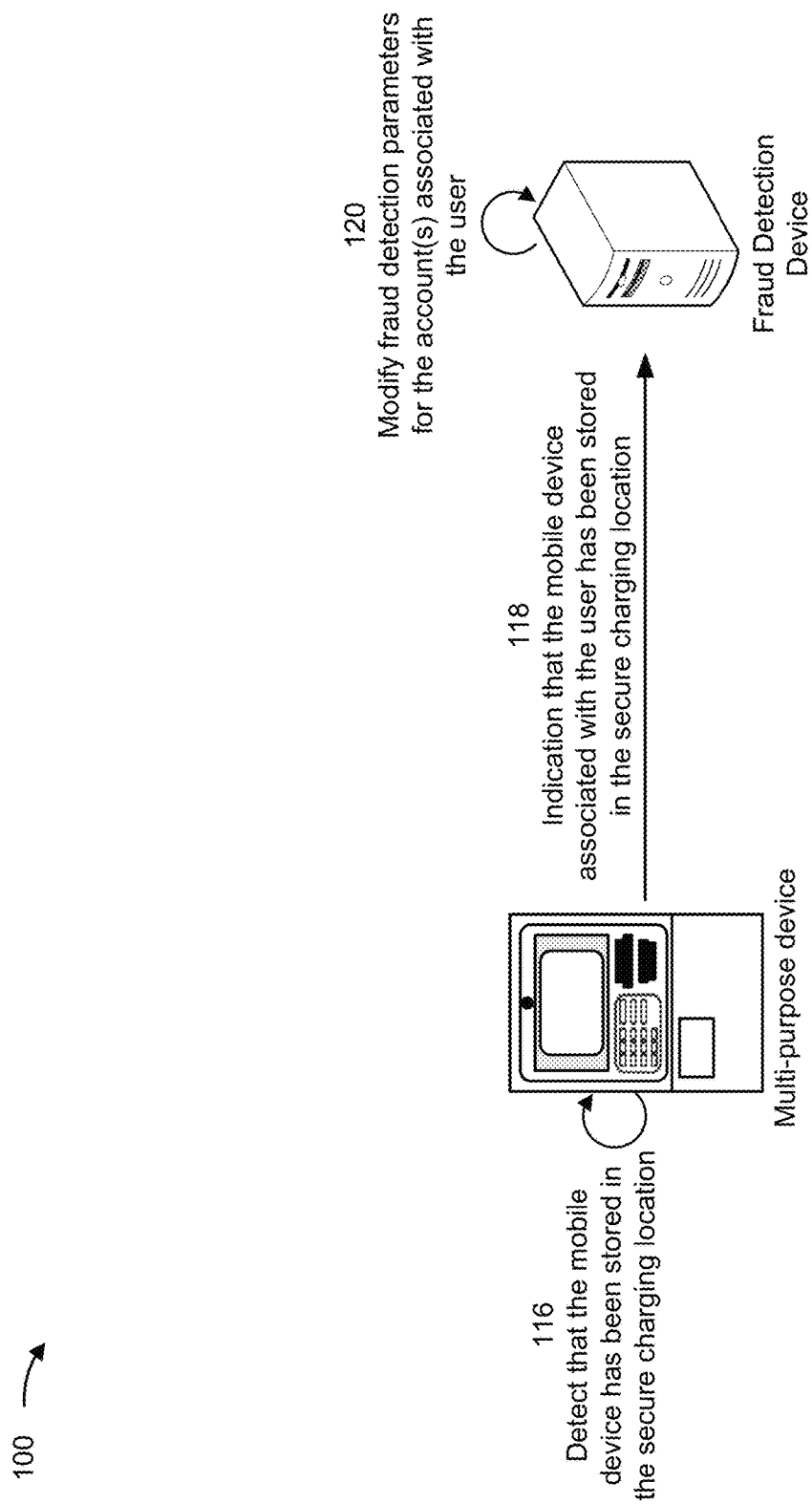

As shown in FIG. 1B, and by reference number 116, the multi-purpose device may detect that a mobile device associated with the user has been placed in the secure charging location (e.g., the secure mobile device charging location). For example, the multi-purpose device may use one or more components or sensors to confirm that a mobile device may be deposited within the secure charging location. This may improve fraud determinations by avoiding scenarios in which the user selects an option to store or charge the mobile device, but does not actually place the mobile device within the secure charging area (e.g., and the fraud detection device incorrectly determines that the user's mobile device is stored in the secure mobile device charging location).

In some implementations, the multi-purpose device may detect that the mobile device associated with the user has been placed in the secure charging location based on receiving confirmation from the user (e.g., via the keypad and/or a touch screen input via the display), as described above. In some implementations, the multi-purpose device may detect that the mobile device associated with the user has been placed in the secure charging location based on detecting a presence of the mobile device in the secure charging location. For example, the multi-purpose device may detect presence of the mobile device in the secure charging location based on an electricity draw from an outlet or a charger included in the secure charging location (e.g., indicating that the mobile device is plugged in and/or drawing charge from the outlet or the charger). Additionally, or alternatively, the multi-purpose device may detect presence of the mobile device in the secure charging location based on an input received from a door sensor (e.g., indicating whether the door of the secure charging location is closed), an optical sensor (e.g., detecting the mobile device using optics or light), a weight sensor (e.g., detecting the mobile device based on a change in weight of an area in the secure charging location), a camera associated with the secure charging location (e.g., detecting an image of a mobile device in the secure charging location), and/or another sensor associated with the secure mobile device charging location.

In some implementations, the multi-purpose device may detect with the door of the secure mobile device charging location has been closed and/or locked after detecting that the mobile device has been stored in the secure mobile device charging location. For example, the multi-purpose device may detect, via one or more sensors associated with the door, whether the door has been closed and/or locked. If the multi-purpose device detects that the door has not been closed and/or locked, then the multi-purpose device may cause a notification to be provided to the user indicating that the door has not been closed and/or locked. For example, a speaker of the multi-purpose device may output an audio notification to alert the user that the door has not been closed and/or locked. Additionally, or alternatively, the multi-purpose device may cause a text and/or visual notification to be presented via the display of the multi-purpose device to alert the user that the door has not been closed and/or locked. This may improve a security of the mobile device by ensuring, or a reducing a likelihood, that the user leaves the mobile device in the secure mobile device charging location without the door being closed and/or locked.

As shown by reference number 118, the multi-purpose device may transmit, and the fraud detection device may receive, an indication that the mobile device associated with the user has been placed in the secure charging location (e.g., that the mobile device is stored in the secure mobile device charging location). For example, the multi-purpose device may transmit the indication that the mobile device associated with the user has been placed in the secure charging location based on detecting that the mobile device associated with the user has been placed in the secure charging location and/or based on authenticating the user. In some implementations, the indication that the mobile device associated with the user has been placed in the secure charging location may include an indication or identifier of the user, the account associated with the user, and/or the authentication information (e.g., to enable the fraud detection device to associate with indication that the mobile device associated with the user has been placed in the secure charging location with the correct user and/or account).

As shown by reference number 120, the fraud detection device may modify one or more fraud detection parameters for exchanges, associated with the account, that occur within a threshold distance from a location of the multi-purpose device (e.g., based on receiving the indication that the mobile device is stored in the secure mobile device charging location). As used herein, "exchange" may refer to a transaction, an electronic exchange, a sale, a purchase, and/or a transfer, among other examples. For example, "exchange" and "transaction" may be used interchangeably herein. For example, the fraud detection device may modify how fraud determinations are made for exchanges associated with the account based on receiving the indication that the mobile device is stored in the secure mobile device charging location.

For example, the fraud detection device may modify one or more parameters associated with fraud determinations based on receiving the indication that the mobile device is stored in the secure mobile device charging location. In some implementations, the fraud detection device may modify one or more thresholds (e.g., one or more values of the threshold(s)) based on receiving the indication that the mobile device is stored in the secure mobile device charging location. In some implementations, the fraud detection device may modify what information, or what type of information, is used to make fraud determinations based on receiving the indication that the mobile device is stored in the secure mobile device charging location. For example, the fraud detection device may modify what is provided as an input to a machine learning model that detects fraud associated with exchanges.

In some implementations, the fraud detection device may modify a machine learning model that is used to detect fraud based on receiving the indication that the mobile device is stored in the secure mobile device charging location. For example, the fraud detection device may be associated with multiple models (e.g., multiple machine learning models) for detecting fraud. The fraud detection device may use a first machine learning model if the mobile device is stored in the secure mobile device charging location and the fraud detection device may use a second machine learning model if the mobile device is not stored in the secure mobile device charging location. In other words, the fraud detection device may use different machine learning models for detecting fraud based on whether the fraud detection device receives and indication that the mobile device is stored in the secure mobile device charging location.

In some implementations, the fraud detection device may modify one or more fraud detection parameters for exchanges associated with one or more other accounts of the user. For example, the account associated with the authentication information and/or a transaction card presented to the multi-purpose device may be associated with a first account (e.g., a debit account). The user may be associated with a second account (e.g., a credit account) that is associated with the institution. The fraud detection device may modify one or more fraud detection parameters for exchanges associated with second account (e.g., and/or all accounts of the user associated with the institution) in a similar manner as described in more detail elsewhere herein. In other words, the one or more fraud detection parameters may be modified for a card or an exchange medium associated with the user and a different account (e.g., than the account used to authenticate the user).

In some implementations, the fraud detection device may modify one or more fraud detection parameters for exchanges associated with the account based on the account being associated with a single authorized user. For example, if the account is associated with multiple authorized users, then transactions that do not occur within a geographic proximity of the multi-purpose device are not necessarily associated with an increased likelihood of fraud (e.g., because another authorized user may be initiating that transaction that does not occur near the multi-purpose device). Therefore, in some implementations, the fraud detection device refrain from modifying the one or more fraud detection parameters for exchanges associated with the account based on the account being associated with multiple authorized users. Alternatively, the fraud detection device may modify one or more fraud detection parameters for exchanges associated with the account when the account is associated with authorized users. In such examples, the fraud detection device may determine (e.g., using an indication of a card identifier, a card number, or other transaction information) which authorized user, from the multiple authorized users, a given transaction is associated with. In some implementations, the fraud detection device may use a machine learning model (e.g., that analyzes transaction trends or patterns of the multiple authorized users) to determine which authorized user, from the multiple authorized users, a given transaction is associated with. If the given transaction is associated with the user that has deposited the mobile device in the multi-purpose device, then the fraud detection device may use the modified fraud detection parameter(s) to determine if the given transaction is associated with fraud, as explained in more detail elsewhere herein. If the given transaction is associated with another authorized user (e.g., that is not the user), then the fraud detection device may not use the modified fraud detection parameter(s) to determine if the given transaction is associated with fraud (e.g., may use typical or unmodified fraud detection parameter(s)).

Figure 1C:
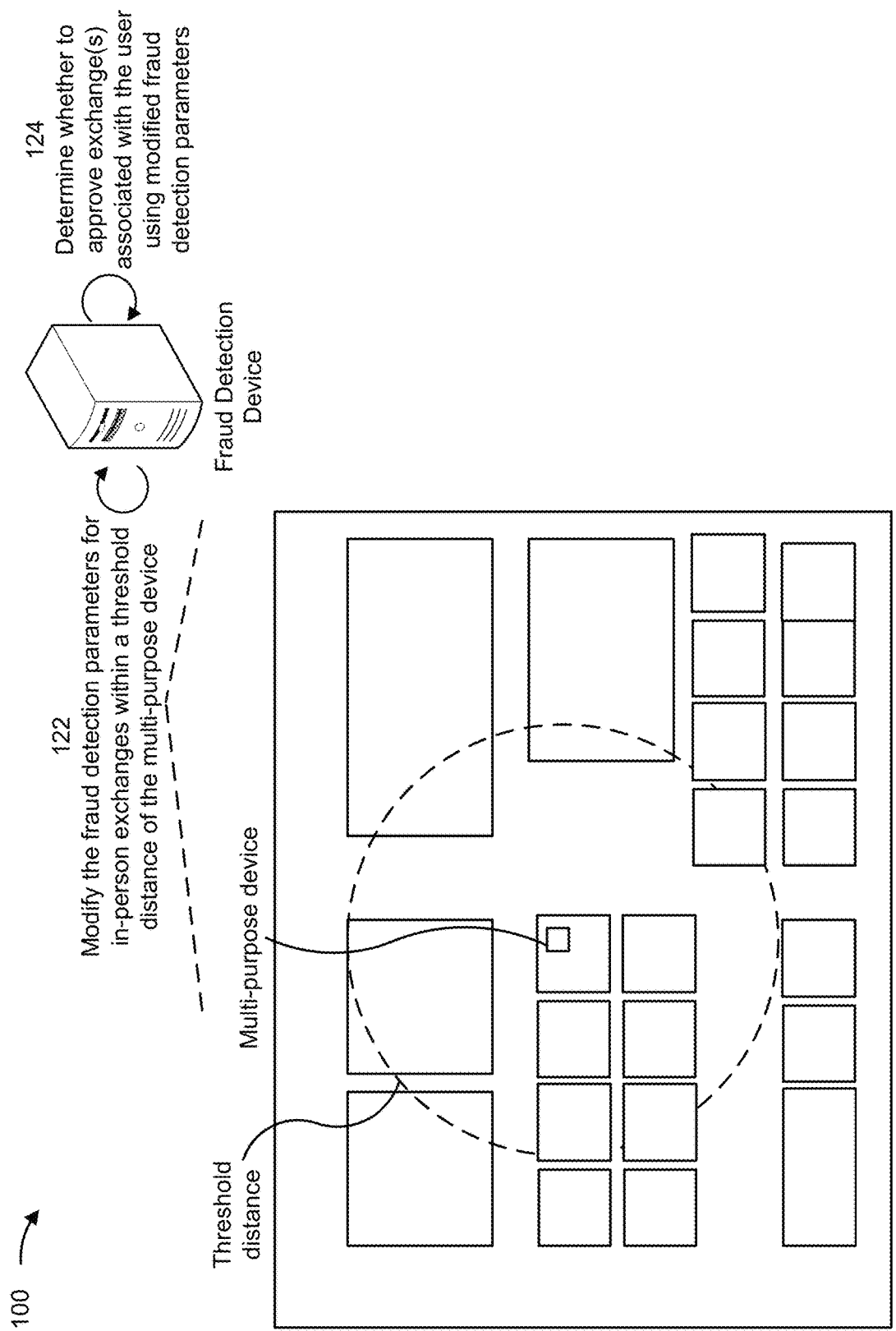

As shown in FIG. 1C, in some implementations, the fraud detection device may modify one or more fraud detection parameters for certain types of exchanges. For example, as shown by reference number 122, the fraud detection device may modify how fraud determinations are made for in-person and/or card-present exchanges associated with the account based on receiving the indication that the mobile device is stored in the secure mobile device charging location. For example, because the mobile device is stored in the multi-purpose device, there is a higher likelihood that the user is in a geographic proximity to the multi-purpose device (e.g., because the user was at the multi-purpose device to deposit the mobile device and because the user needs to retrieve the mobile device, likely before departing the area). The fraud detection device may decrease one or more values or one or more thresholds, associated with the one or more fraud detection parameters, for in-person exchanges, associated with the account, that occur within the threshold distance from the location of the multi-purpose device (e.g., to lessen fraud checks or fraud restrictions for in-person exchanges that occur within the threshold distance from the location of the multi-purpose device because there is a higher likelihood that the user is actually located in this geographic area). For example, as shown in FIG. 1C, the multi-purpose device may be located within a building associated with an entity. The fraud detection device may modify the one or more fraud parameters for exchanges that occur at entities and/or in locations that are included within the dashed-line circle as depicted in FIG. 1C (e.g., the boxes in FIG. 1C may depict different buildings and/or entity locations). In other words, the fraud detection device may modify the fraud determinations to reflect that there is a lower likelihood of fraud associated with in-person exchanges that occur within the threshold distance from the location of the multi-purpose device. In some implementations, the fraud detection device may modify the fraud determinations to reflect that there is a lower likelihood of fraud associated with in-person exchanges that occur within the threshold distance from the location of the multi-purpose device by refraining from performing one or more fraud checks (e.g., a fraud check may be an intermediate determination that is made to determine whether a given exchange is associated with fraud) and/or refraining from providing certain information as an input to a fraud model (e.g., a machine learning model).

In some implementations, the multi-purpose device may fraud detection device may increase one or more values or one or more thresholds, associated with the one or more fraud detection parameters, for in-person exchanges, associated with the account, that do not occur within the threshold distance from the location of the multi-purpose device (e.g., to increase fraud checks for in-person exchanges that do not occur within the threshold distance from the location of the multi-purpose device because there is a lower likelihood that the user is actually located in geographic area outside of the threshold distance from the location of the multi-purpose device). In other words, the fraud detection device may modify the fraud determinations to reflect that there is a higher likelihood of fraud associated with in-person exchanges that occur outside of the threshold distance from the location of the multi-purpose device. Therefore, the fraud detection device may use the location of the multi-purpose device as an approximate location of the user for fraud determination purposes. As a result, the fraud detection device may be enabled to use geographic location information associated with the user without relying on or requiring location-based services to be enabled for the mobile device. This may increase a security associated with the mobile device and/or the user because the mobile device is not transmitting information indicating the geographic location of the mobile device (e.g., which could be intercepted by a malicious actor). Additionally, fraud determinations by the fraud detection device may be improved by modifying fraud detection parameters or models used for fraud determinations associated with the account while the mobile device is stored in the secure mobile device charging location of the multi-purpose device.

In some implementations, the fraud detection device may modify fraud detection parameters, for fraud determination purposes, for other types of exchanges, such as online exchanges or card-not-present exchanges. For example, the fraud detection device may increase one or more values or one or more thresholds, associated with the one or more fraud detection parameters, for online exchanges and/or card-not-present exchanges associated with the account. For example, because the user does not have access to the mobile device and because the user is likely in a geographic proximity to the multi-purpose device (e.g., and not in a home of the user or near a computing device of the user, such as a desktop computer), there is a lower likelihood that the user will be conducting online exchanges and/or card-not-present exchanges while the mobile device is stored within the secure mobile device charging location. Therefore, the fraud detection device may the fraud detection device may modify the fraud determinations to reflect that there is a higher likelihood of fraud associated with online exchanges and/or card-not-present exchanges while the mobile device is stored within the secure mobile device charging location.

In some implementations, rather than modifying actual thresholds and/or parameters, the fraud detection device may modify the fraud detection determination by providing an indication that the mobile device associated with the user is stored in the multi-purpose device as an input to a fraud model (e.g., a machine learning model). The fraud model may receive one or more additional inputs. The fraud model may output a fraud score (e.g., that is based on the inputs, including the indication that the mobile device associated with the user is stored in the multi-purpose device) that indicates a likelihood that a given exchange is associated with fraud.

As shown by reference number 124, the fraud detection device may determine whether to approve or deny an exchange based on determining whether the exchange is fraudulent using the modified one or more fraud detection parameters and based on an exchange location associated with the exchange. For example, the fraud detection device may receive an indication of an exchange, associated with the account, that has been initiated. The fraud detection device may determine one or more parameters, values of one or more parameters, values of one or more threshold, a machine learning model, and/or other fraud determination parameters to be used to determine if the exchange is associated with fraud based on the exchange location associated with the exchange (e.g., the geographic location at which the exchange is initiated) and/or based on a type of exchange (e.g., in-person, card-present, online, card-not-present, and/or other types of exchanges). In other words, the fraud detection device may determine whether the exchange is associated with fraud differently based on the exchange location associated with the exchange and/or the type of exchange. For example, if the exchange location indicates that the exchange was initiated within the threshold distance from the location of the multi-purpose device, then the fraud detection device may determine that the exchange has a lower likelihood of being associated with fraud. If the type of exchange indicates that the exchange is an online exchange or a card-not-present exchange, then the fraud detection device may determine that the exchange has a higher likelihood of being associated with fraud.

If the fraud detection device determines that the exchange is not associated with fraud (e.g., based on a calculated fraud score not satisfying a fraud threshold), then the fraud detection device may enable the exchange to be completed. If fraud detection device determines that the exchange is associated with fraud (e.g., based on a calculated fraud score satisfying the fraud threshold), then the fraud detection device may not enable the exchange to be completed (e.g., may cause the exchange to be denied or declined). As a result, fraud determinations by the fraud detection device may be improved by using the location of the multi-purpose device as an approximate location of the user when the mobile device, associated with the user, is stored within the multi-purpose device (e.g., within the secure mobile device charging location of the multi-purpose device).

Figure 1D:
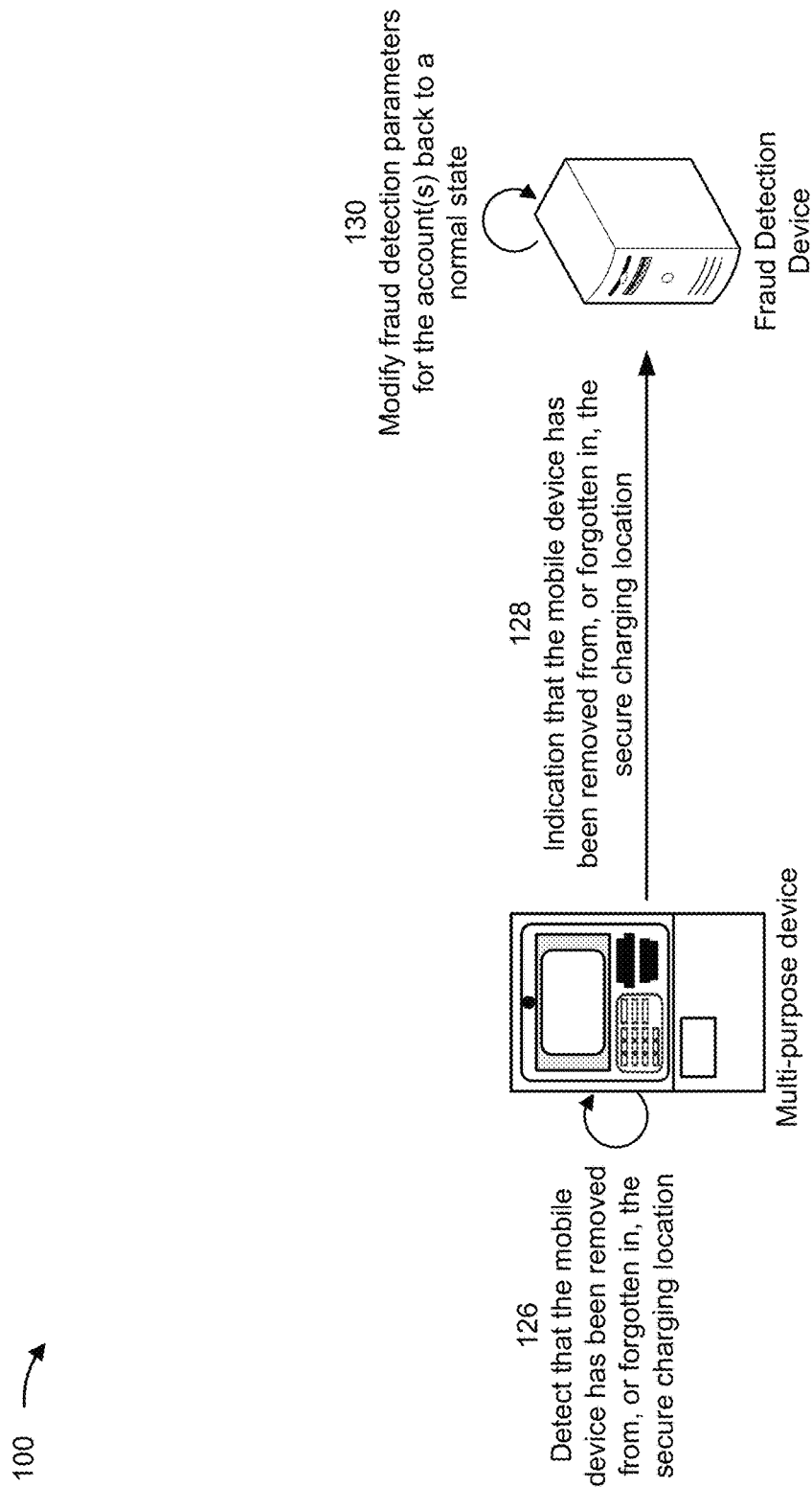

As shown in FIG. 1D, and by reference number 126, the multi-purpose device may detect that the mobile device associated with the user has been removed from the secure mobile device charging location. In some implementations, the multi-purpose device may detect that the mobile device has been removed in a similar manner as described above in connection with detecting that the mobile device has been placed within the secure mobile device charging location (e.g., using one or more sensors, cameras, and/or other information). In some implementations, the multi-purpose device may detect that the mobile device has been removed based on receiving an input from the user. For example, the user may retrieve the mobile device based on providing authentication information (e.g., the same, or similar, authentication information as described elsewhere herein) to the multi-purpose device. As another example, the user may retrieve the mobile device based on providing a unique code (e.g., that is generated by the multi-purpose device and provided to the user when the user deposits the mobile device). The multi-purpose device may authenticate the user based on the authentication information and/or the unique code (e.g., in a similar manner as described above and/or based on communicating with another device, such as the fraud detection device). If the user is authenticated (e.g., as being associated with the account and/or the mobile device), then the multi-purpose device may cause a door of the secure mobile device charging location to be unlocked or opened (e.g., to enable the user to remove the mobile device from the secure mobile device charging location). This may improve a security of the mobile device by ensuring that only authenticated users are enabled to remove the mobile device from the secure mobile device charging location. The multi-purpose device may detect that the mobile device has been removed based on causing the door of the secure mobile device charging location to be unlocked or opened.

In some implementations, the multi-purpose device may detect that the mobile device has been forgotten by the user in the secure charging location. For example, the user may leave the geographic proximity of the multi-purpose device, but forget to retrieve the mobile device from the multi-purpose device. In some implementations, the fraud detection device may identify that the mobile device has been forgotten by the user in the secure mobile device charging location (e.g., with, or without, receiving an indication that the mobile device has been forgotten from the multi-purpose device). The multi-purpose device and/or the fraud detection device may identify or detect that the mobile device has been forgotten by the user in the secure charging location based on an amount of time that the mobile device has been stored in the secure mobile device charging location. For example, the multi-purpose device may determine that an amount of time from the time at which the mobile device was received and/or detected in the secure mobile device charging location satisfies a forgotten threshold (e.g., that is associated with an amount of time indicative of a user having forgotten the mobile device). In some implementations, the forgotten threshold may be set by the user and/or the institution associated with the account. As another example, the fraud detection device may determine that an amount of time from receiving the indication (e.g., from the multi-purpose device, such as described above in connection with reference number 118) that the mobile device is stored in the secure mobile device charging location satisfies the forgotten threshold.

As another example, the multi-purpose device and/or the fraud detection device may identify or detect that the mobile device has been forgotten by the user in the secure charging location based on hours of operation associated with a building in which the multi-purpose device is located. For example, the multi-purpose device and/or the fraud detection device may receive an indication of the hours of operation associated with the building. The hours of operation may indicate times during which the building is open to the public (e.g., staff and other employees may be allowed inside the building outside of the hours of operation). The multi-purpose device and/or the fraud detection device may identify that a current time is outside of the hours of operation (e.g., indicating that the entity associated with the building is no longer open for business). Therefore, the user would be unable to re-enter the building to retrieve the mobile device from the multi-purpose device, thereby indicating that the user has forgotten the mobile device. As another example, the multi-purpose device and/or the fraud detection device may identify or detect that the mobile device has been forgotten by the user in the secure charging location based on a current time. For example, if a mobile device remains stored in the secure mobile device charging location after a certain time (e.g., 11:00 PM), then the multi-purpose device and/or the fraud detection device may identify or detect that the mobile device has been forgotten by the user.

As shown by reference number 128, the multi-purpose device may transmit, and the fraud detection device may receive, an indication that the mobile device associated with the user has been removed from the secure mobile device charging location (e.g., based on the multi-purpose device detecting that the mobile device associated with the user has been removed from the secure mobile device charging location). In some implementations, the multi-purpose device may transmit, and the fraud detection device may receive, an indication that the mobile device has been forgotten by the user in the secure charging location (e.g., based on the multi-purpose device detecting that the mobile device has been forgotten by the user). In such examples, the fraud detection device may identify that the mobile device has been forgotten by the user based on receiving the indication from the multi-purpose device.

In some implementations, such as when the multi-purpose device and/or the fraud detection device identify that the user has forgotten the mobile device in the secure charging location, the multi-purpose device and/or the fraud detection device (or another device) may transmit a notification to a device associated with the user indicating that the mobile device is still stored within the multi-purpose device. For example, the fraud detection device (or another device) may transmit a notification via an electronic message, an email, a text message (e.g., to a contact number that is associated with a device other than the mobile device stored in the multi-purpose device), and/or another type of messaging, to alert the user that the mobile device is still stored within the multi-purpose device.

As shown by reference number 130, the fraud detection device may modify the fraud detection parameter(s) for the account(s) associated with the user to return the one or more fraud detection parameters back to a normal state. As used herein, "normal state" may refer to a state (e.g., a value or a setting) of the fraud detection parameter(s) for the account(s) that would otherwise be present if the fraud detection device had not received the indication that the mobile device is stored in the multi-purpose device (e.g., the state of the fraud detection parameters prior to the modification made by the fraud detection device, as described in more detail elsewhere herein, such as in connection with reference numbers 120 and 122). In other words, the normal state of the fraud detection parameter(s) may be values or settings of the fraud detection parameter(s) that would be present if the fraud detection device was unaware of the location of the mobile device and/or assumed that the user was in possession of the mobile device. For example, the indication that the mobile device associated with the user has been removed from the secure mobile device charging location and/or that the mobile device has been forgotten by the user in the secure charging location may cause the one or more fraud detection parameters to be returned to the normal state. This may improve an accuracy of the fraud determinations made by the fraud detection device by ensuring that the modified fraud detection parameter(s) or modified models are not used by the fraud detection device when the user is no longer in, or has a likelihood of no longer being in, a geographic proximity to the multi-purpose device.

As indicated above, FIGS. 1A-1D are provided as an example. Other examples may differ from what is described with regard to FIGS. 1A-1D.

Figure 2:
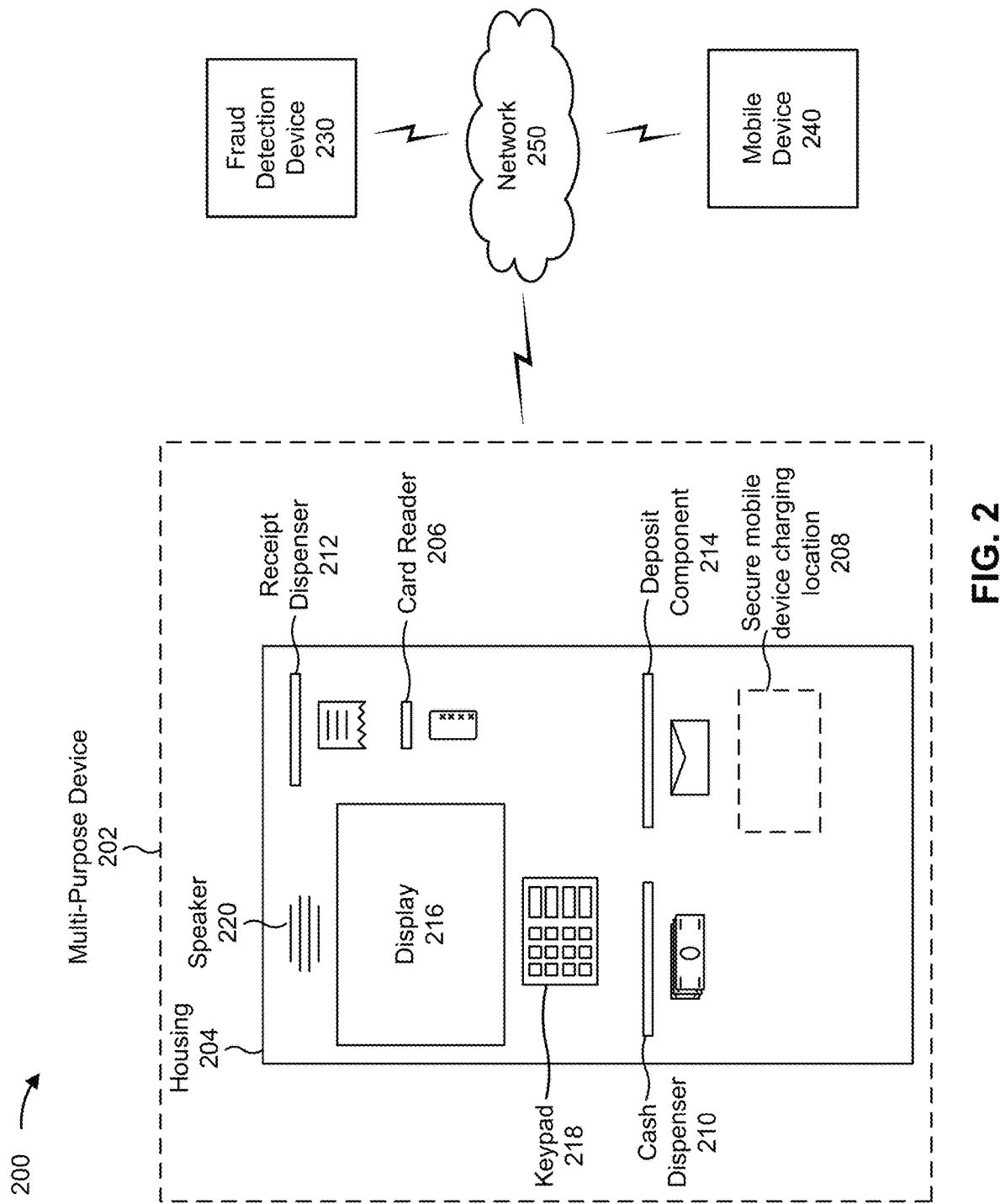
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a multi-purpose device 202, a fraud detection device 230, a mobile device 240, and a network 250. As shown in FIG. 2, the multi-purpose device 202 may include one or more of a housing 204, a card reader 206, a secure mobile device charging location 208, a cash dispenser 210, a receipt dispenser 212, a deposit component 214, a display 216, a keypad 218, and/or a speaker 220. Devices of environment 200 may interconnect via wired connections, wireless connections, or a combination of wired and wireless connections.

The multi-purpose device 202 includes one or more devices capable of receiving, generating, storing, processing, providing, and/or routing information associated with fraud detection based on a mobile device (e.g., the mobile device 240) being stored in a multi-purpose device secure mobile device charging location, as described elsewhere herein. In some implementations, the multi-purpose device 202 may include one or more devices capable of performing one or more financial transactions, such as a cash withdrawal, a money deposit (e.g., a check or cash deposit), a money transfer (e.g., a transfer from one bank account to another bank account), and/or providing access to account information (e.g., a bank account, a checking account, a credit card account, etc.). The multi-purpose device 202 may be, or may include, an ATM or a similar device, such as an automated banking machine (ABM), a cash point, a Cashline®, a Minibank®, a cash machine, a Tyme® machine, a cash dispenser, a Bankomat®, a Bancomat®, and/or a similar type of device. Although examples described herein depict the multi-purpose device 202 as an ATM or similar device, the multi-purpose device 202 may be another device having multiple purposes (e.g., the multiple purposes at least including providing the secure mobile device charging location 208), such as a storage locker, a storage device, a transaction terminal, a point-of-sale device, and/or another device.

The multi-purpose device 202 includes a housing 204 that houses one or more components and/or portions of one or more components of the multi-purpose device 202, such as one or more components of the multi-purpose device 202 described in connection with FIG. 2. The housing may be constructed to prevent unauthorized access to internal components of the multi-purpose device 202, such as the secure mobile device charging location 208 and/or other storage compartments that physically store cards, mobile devices, currency (e.g., cash, banknotes), and/or deposits (e.g., checks)

The card reader 206 includes one or more components for reading account information from a card. For example, the card reader 206 may include a motorized card reader or another type of card reader with one or more actuators capable of ejecting or retracting a card. The card reader may include a reading component to read account information from the card (e.g., an account identifier, an expiration date), such as a magnetic stripe reader, a chip reader, and/or a near field communication (NFC) reader. The card may be, for example, a transaction card, an ATM card, a bank card, a credit card, and/or a debit card.

The secure mobile device charging location 208 may be housed within the housing 204 and physically stores mobile devices that have been deposited into the secure mobile device charging location 208 by users. For example, a user may place a mobile device within the secure mobile device charging location 208 to enable the mobile device to be charged. In some implementations, the secure mobile device charging location 208 may include one or more components to facilitate charging the mobile device, such as a mobile device charger, an outlet, a wireless charger, and/or other components to facilitate charging a battery of a mobile device. In some implementations, the secure mobile device charging location 208 may include one or more sensors to detect whether a door or opening of the secure mobile device charging location 208 is closed. Additionally, or alternatively, the secure mobile device charging location 208 may include one or more sensors to detect whether a mobile device has been placed within the secure mobile device charging location 208. The one or more sensors may include weight sensors, light sensors, magnetic door sensors, an optical sensor, a camera, and/or another type of sensor. In some implementations, the secure mobile device charging location 208 may include a door or other opening (e.g., to enable a user to access the secure mobile device charging location 208 through the housing 204) that includes a locking mechanism to prevent unauthorized access to the secure mobile device charging location 208.

The cash dispenser 210 includes one or more components for dispensing cash as part of a financial transaction performed using the multi-purpose device 202. The cash dispenser 210 includes one or more actuators capable of obtaining cash from a cash storage compartment housed within the housing 204 and dispensing the obtained cash for removal by a user (e.g., from the cash dispenser 210 and/or a cash tray to which the cash is dispensed). In some implementations, the cash dispenser 210 is capable of ejecting cash, retracting cash (e.g., if the cash is not removed after a threshold amount of time), and/or providing retracted cash to a cash storage compartment (which may be the same as or different from the cash storage compartment from which the cash is obtained). The receipt dispenser 212 includes one or more components capable of printing and dispensing a receipt (e.g., by applying ink to paper) associated with a financial transaction performed using the multi-purpose device 202.

The deposit component 214 includes one or more components capable of accepting a deposit insert to the deposit component 214 by a user. In some implementations, the deposit component 214 includes a check reader (e.g., a motorized check reader) capable of reading a check and providing deposit information for performing a financial transaction (e.g., a deposit or funds transfer). In some implementations, the deposit component 214 includes one or more actuators capable of retracting a check (or other deposit note), ejecting a check (e.g., if the check is not valid), and/or providing a retracted check to a check storage compartment.

The display 216 includes any type of display capable of outputting information for display. For example, the display 216 may include a monitor, a screen, a touch screen, a light-emitting diode (LED) display, and/or a cathode-ray tube (CRT) display, among other examples. The keypad 218 includes one or more input components that permit a user to provide input to the multi-purpose device 202 (e.g., to the processor 222 of the multi-purpose device 202). For example, the keypad 218 may be and/or may include a number pad, a personal identification number (PIN) pad, a keyboard, a set of buttons (e.g., mechanical buttons that use mechanical actuation or electronic buttons that use electronic actuation), and/or another type of input component. In some implementations, the keypad 218 may be integrated with the display 216, such as for a touch screen. The speaker 220 includes any type of component capable of outputting audio and/or producing sound. For example, the speaker 220 may be and/or may include a loudspeaker, a dynamic speaker, and/or an audio amplifier, among other examples.

The fraud detection device 230 includes one or more devices capable of receiving, generating, storing, processing, providing, and/or routing information associated with fraud detection based on a mobile device (e.g., the mobile device 240) being stored in a multi-purpose device secure mobile device charging location, as described elsewhere herein. The fraud detection device 230 may include a communication device and/or a computing device. For example, the fraud detection device 230 may include a server, such as an application server, a client server, a web server, a database server, a host server, a proxy server, a virtual server (e.g., executing on computing hardware), or a server in a cloud computing system. In some implementations, the fraud detection device 230 includes computing hardware used in a cloud computing environment.

The mobile device 240 includes one or more devices capable of receiving, generating, storing, processing, and/or providing information associated with fraud detection based on the mobile device 240 being stored in a multi-purpose device secure mobile device charging location (e.g., the secure mobile device charging location 208), as described elsewhere herein. The mobile device 240 may include a communication device and/or a computing device. For example, the mobile device 240 may include a wireless communication device, a mobile phone, a user equipment, a laptop computer, a tablet computer, a wearable communication device (e.g., a smart wristwatch, a pair of smart eyeglasses, a head mounted display, or a virtual reality headset), or a similar type of device.

The network 250 includes one or more wired and/or wireless networks. For example, the network 250 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 250 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
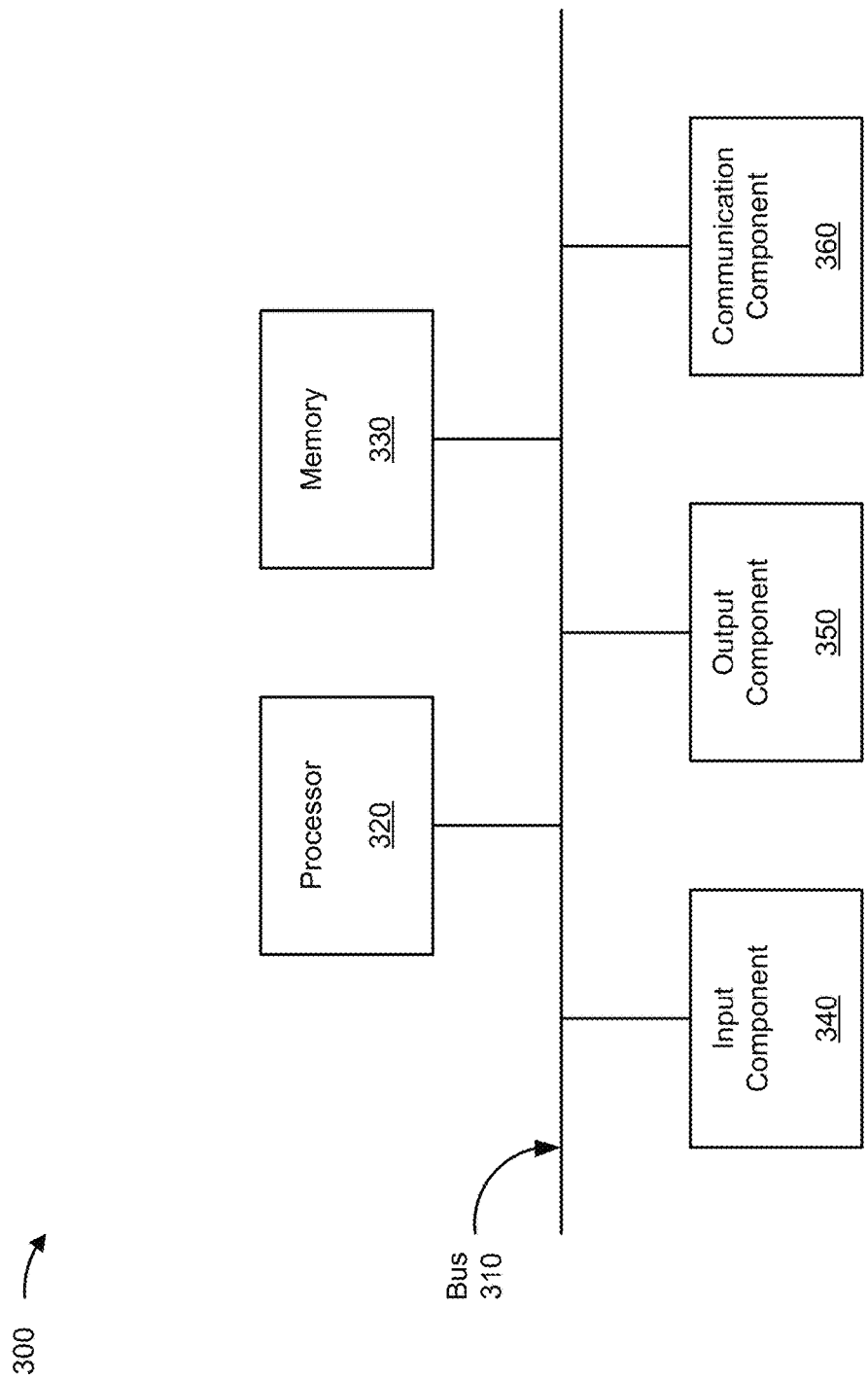
FIG. 3 is a diagram of example components of one or more devices of FIG. 2.

FIG. 3 is a diagram of example components of a device 300, which may correspond to the multi-purpose device 202, the fraud detection device 230, and/or the mobile device 240. In some implementations, the multi-purpose device 202, the fraud detection device 230, and/or the mobile device 240 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
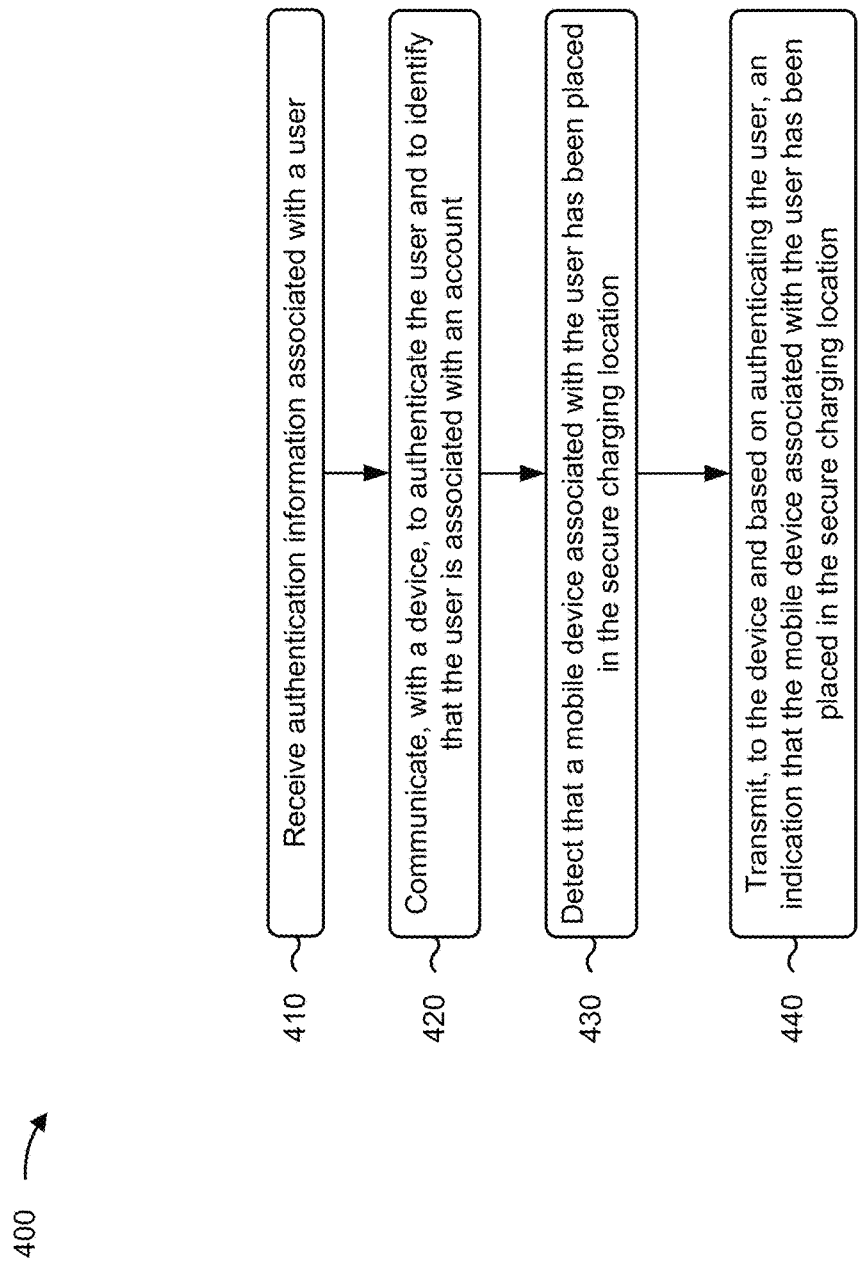
FIGS. 4 and 5 are flowcharts of example processes relating to multi-purpose device secure mobile device charging locations.

FIG. 4 is a flowchart of an example process 400 associated with multi-purpose device secure mobile device charging locations. In some implementations, one or more process blocks of FIG. 4 may be performed by a multi-purpose device (e.g., multi-purpose device 202). In some implementations, one or more process blocks of FIG. 4 may be performed by another device or a group of devices separate from or including the multi-purpose device, such as the fraud detection device 230 and/or the mobile device 240, among other examples. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving authentication information associated with a user (block 410). As further shown in FIG. 4, process 400 may include communicating, with a fraud detection device, to authenticate the user and to identify that the user is associated with an account (block 420). As further shown in FIG. 4, process 400 may include detecting that a mobile device associated with the user has been placed in the secure charging location (block 430). As further shown in FIG. 4, process 400 may include transmitting, to the fraud detection device and based on authenticating the user, an indication that the mobile device associated with the user has been placed in the secure charging location (block 440).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1D.

Figure 5:
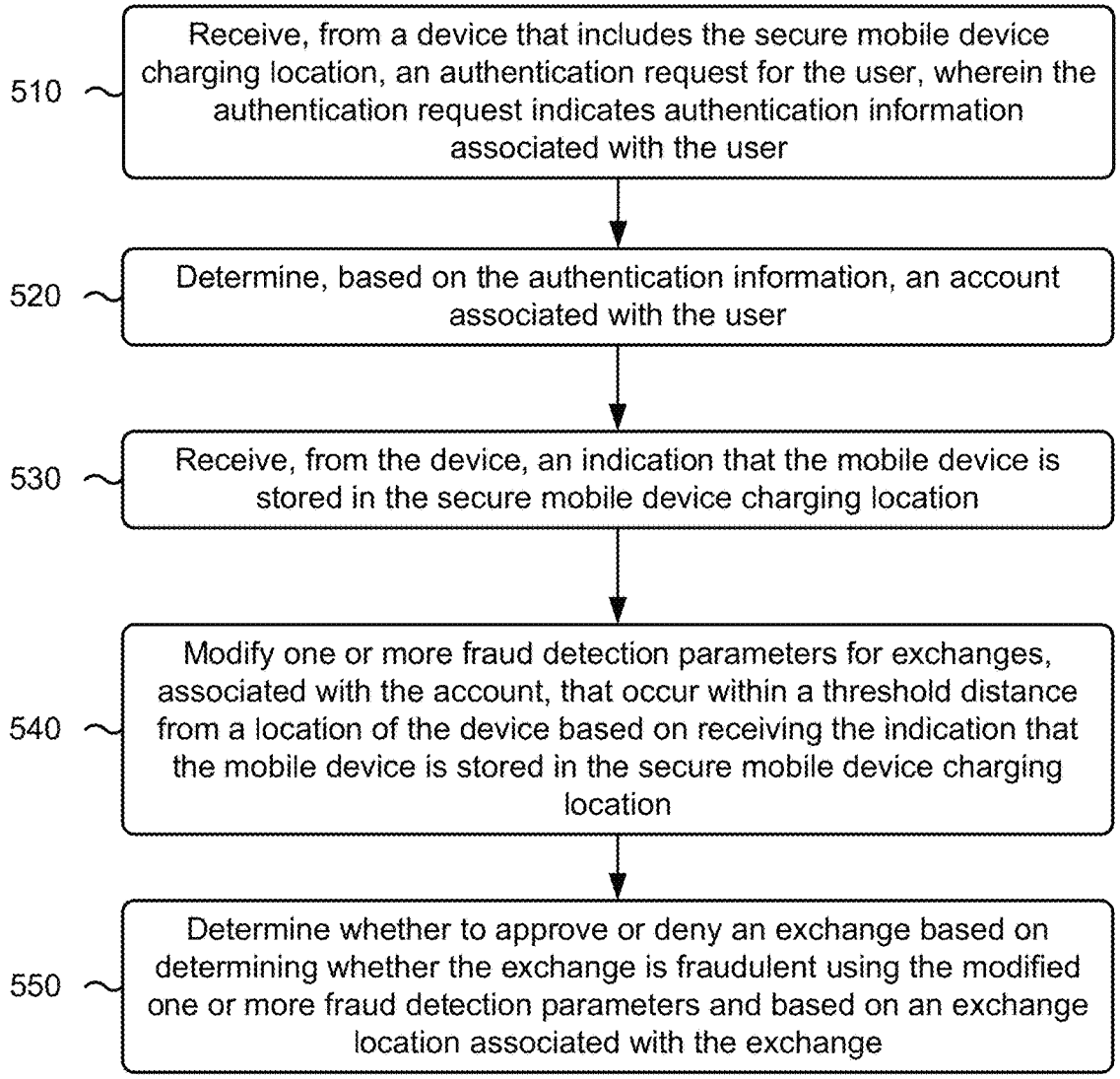

FIG. 5 is a flowchart of an example process 500 associated with multi-purpose device secure mobile device charging locations. In some implementations, one or more process blocks of FIG. 5 may be performed by a fraud detection device (e.g., fraud detection device 230). In some implementations, one or more process blocks of FIG. 5 may be performed by another device or a group of devices separate from or including the fraud detection device, such as the multi-purpose device 202 and/or the mobile device 240, among other examples. Additionally, or alternatively, one or more process blocks of FIG. 5 may be performed by one or more components of device 300, such as processor 320, memory 330, input component 340, output component 350, and/or communication component 360.

As shown in FIG. 5, process 500 may include receiving, from a device that includes the secure mobile device charging location, an authentication request for the user (block 510). In some implementations, the authentication request indicates authentication information associated with the user. As further shown in FIG. 5, process 500 may include determining, based on the authentication information, an account associated with the user (block 520). As further shown in FIG. 5, process 500 may include receiving, from the device, an indication that the mobile device is stored in the secure mobile device charging location (block 530). As further shown in FIG. 5, process 500 may include modifying one or more fraud detection parameters for exchanges, associated with the account, that occur within a threshold distance from a location of the device based on receiving the indication that the mobile device is stored in the secure mobile device charging location (block 540). As further shown in FIG. 5, process 500 may include determining whether to approve or deny an exchange based on determining whether the exchange is fraudulent using the modified one or more fraud detection parameters and based on an exchange location associated with the exchange (block 550).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1D.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of determination of financial transaction fraud based on a mobile device of a user being stored in a secure mobile device charging location, comprising:

receiving, by a server device and from a device that includes the secure mobile device charging location, an authentication request for the user, wherein the authentication request indicates authentication information associated with the user;

determining, by the server device and based on the authentication information, an account associated with the user;

receiving, by the server device and from the device, an indication that the mobile device is stored in the secure mobile device charging location;

modifying, by the server device, one or more first financial fraud detection parameters, associated with the account, to one or more second financial fraud detection parameters that correspond to the mobile device being in the secure mobile device charging location based on receiving the indication that the mobile device is stored in the secure mobile device charging location, wherein the one or more second financial fraud detection parameters apply to financial transactions that occur within a threshold distance from a location of the device; and determining, by the server device, whether to approve or deny a financial transaction based on determining whether the financial transaction is fraudulent using the one or more second financial fraud detection parameters and based on a location associated with the financial transaction.

2. The method of claim 1, wherein modifying the one or more first financial fraud detection parameters comprises:
decreasing one or more values or one or more thresholds, associated with the one or more first financial fraud detection parameters, for in-person financial transactions, associated with the account, that occur within the threshold distance from the location of the device.

3. The method of claim 1, wherein modifying the one or more first financial fraud detection parameters comprises:
increasing one or more values or one or more thresholds, associated with the one or more first financial fraud detection parameters, for card-not-present financial transactions associated with the account.

4. The method of claim 1, further comprising:
receiving, from the device, an indication that the mobile device has been removed from the secure mobile device charging location; and
modifying the one or more second financial fraud detection parameters, for the account, to the one or more first financial fraud detection parameters.

5. The method of claim 1, further comprising:
identifying that the mobile device has been forgotten by the user in the secure mobile device charging location; and
modifying the one or more second financial fraud detection parameters, for the account, to the one or more first financial fraud detection parameters.

6. The method of claim 5, wherein identifying that the mobile device has been forgotten by the user in the secure mobile device charging location is based on at least one of:
an amount of time from receiving the indication that the mobile device is stored in the secure mobile device charging location;
receiving, from the device, an indication that the mobile device has been forgotten by the user in the secure mobile device charging location; or
hours of operation associated with a building in which the device is located.

7. The method of claim 1, wherein the authentication information includes a card number and a secure code associated with the account.

8. The method of claim 1, wherein the one or more first financial fraud detection parameters are modified for a card or a financial transaction medium associated with a different account corresponding to the user.

9. A multi-purpose device for detection of financial transaction fraud based on secure mobile device charging, the multi-purpose device comprising:
a secure charging location for charging mobile devices;
one or more memories; and
one or more processors, coupled to the one or more memories, configured to:
receive authentication information associated with a user;
communicate, with a fraud detection device that detects financial transaction fraud, to authenticate the user and to identify that the user is associated with an account;
detect that a mobile device associated with the user has been placed in the secure charging location; and
transmit, to the fraud detection device and based on authenticating the user, an indication that the mobile device associated with the user has been placed in the secure charging location,
wherein the indication that the mobile device has been placed in the secure charging location triggers modification of one or more first fraud detection parameters, associated with detecting financial transaction fraud, to one or more second fraud detection parameters, associated with detecting financial transaction fraud, that correspond to the mobile device being in the secure charging location.

10. The multi-purpose device of claim 9, wherein the one or more processors, to detect that the mobile device associated with the user has been placed in the secure charging location, are configured to:
detect a presence of the mobile device based on at least one of:
an electricity draw from an outlet or a charger included in the secure charging location; or
an input received from a door sensor, an optical sensor, a weight sensor, or a camera associated with the secure charging location.

11. The multi-purpose device of claim 9, wherein the one or more processors, to receive the authentication information, are configured to:
receive an indication of an account number associated with the account and a secure code associated with the account.

12. The multi-purpose device of claim 9, further comprising a card reader and a keypad, wherein the one or more processors, to receive the authentication information, are configured to:
receive the authentication information via at least one of:
a card presented to the card reader, or
an input to the keypad.

13. The multi-purpose device of claim 9, wherein the one or more processors are further configured to:
detect that the mobile device associated with the user has been removed from the secure charging location; and
transmit, to the fraud detection device, an indication that the mobile device associated with the user has been removed from the secure charging location to cause one or more fraud detection parameters, used by the fraud detection device, to be returned to a normal state.

14. The multi-purpose device of claim 9, wherein the one or more processors are further configured to:
detect that the mobile device has been forgotten by the user in the secure charging location; and
transmit, to the fraud detection device, an indication that the mobile device has been forgotten by the user in the secure charging location to cause one or more fraud detection parameters, used by the fraud detection device, to be returned to a normal state.

15. The multi-purpose device of claim 9, wherein the multi-purpose device is associated with an automated teller machine (ATM), an automated banking machine, or a cash machine.

16. A non-transitory computer-readable medium storing a set of instructions, the set of instructions comprising:

one or more instructions that, when executed by one or more processors of a server device, cause the server device to:
- receive, from an automated teller machine (ATM) that includes a secure mobile device location, an authentication request for a user, wherein the authentication request indicates authentication information associated with the user;
- determine, based on the authentication information, an account associated with the user;
- receive, from the ATM, an indication that a mobile device is stored in the secure mobile device location;
- modify one or more first financial fraud detection parameters, associated with the account, to one or more second financial fraud detection parameters that correspond to the mobile device being in the secure mobile device location based on receiving the indication that the mobile device is stored in the secure mobile device location, wherein the one or more second financial fraud detection parameters apply to financial transactions that occur within a threshold distance from a location of the ATM; and
- determine whether to approve or deny a financial transaction based on determining whether the financial transaction is fraudulent using the one or more second financial fraud detection parameters and based on a location associated with the financial transaction.

17. The non-transitory computer-readable medium of claim 16, wherein the one or more instructions, that cause the server device to modify the one or more first financial fraud detection parameters, cause the server device to at least one of:
- decrease one or more values or one or more thresholds, associated with the one or more first financial fraud detection parameters, for in-person financial transactions, associated with the account, that occur within the threshold distance from a location of the ATM; or
- increase one or more values or one or more thresholds, associated with the one or more first financial fraud detection parameters, for card-not-present financial transactions associated with the account.

18. The non-transitory computer-readable medium of claim 16, wherein the one or more instructions further cause the server device to:
- receive, from the ATM, an indication that the mobile device has been removed from the secure mobile device location; and
- modify the one or more second financial fraud detection parameters, for the account, to the one or more first financial fraud detection parameters.

19. The non-transitory computer-readable medium of claim 16, wherein the one or more instructions further cause the server device to:
- identify that the mobile device has been forgotten by the user in the secure mobile device location; and
- modify the one or more second financial fraud detection parameters, for the account, to the one or more first financial fraud detection parameters.

20. The non-transitory computer-readable medium of claim 19, wherein identifying that the mobile device has been forgotten by the user in the secure mobile device location is based on at least one of:
- an amount of time from receiving the indication that the mobile device is stored in the secure mobile device location;
- receiving, from the ATM, an indication that the mobile device has been forgotten by the user in the secure mobile device location; or
- hours of operation associated with a building in which the ATM is located.

* * * * *